(12) United States Patent
Poster

(10) Patent No.: US 8,869,941 B2
(45) Date of Patent: Oct. 28, 2014

(54) DUAL-PATH FLUID INJECTION JET

(75) Inventor: Scott Poster, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/509,967

(22) PCT Filed: Nov. 16, 2009

(86) PCT No.: PCT/US2009/064505
§ 371 (c)(1),
(2), (4) Date: May 15, 2012

(87) PCT Pub. No.: WO2011/059449
PCT Pub. Date: May 19, 2011

(65) Prior Publication Data
US 2012/0222761 A1    Sep. 6, 2012

(51) Int. Cl.
| F16N 7/00 | (2006.01) |
|---|---|
| F16N 7/40 | (2006.01) |
| F16N 17/00 | (2006.01) |
| B05B 7/08 | (2006.01) |
| B05B 1/16 | (2006.01) |
| B05B 1/20 | (2006.01) |
| B64C 13/42 | (2006.01) |
| F16H 57/04 | (2010.01) |
| B05B 9/00 | (2006.01) |
| B05B 9/04 | (2006.01) |
| B05B 15/04 | (2006.01) |
| F01M 5/02 | (2006.01) |
| B05B 15/06 | (2006.01) |

(52) U.S. Cl.
CPC *F16N 7/40* (2013.01); *F16N 17/00* (2013.01); *B05B 7/08* (2013.01); *B05B 1/16* (2013.01); *B05B 9/002* (2013.01); *B05B 9/0409* (2013.01); *F16N 2260/24* (2013.01); *B05B 15/0406* (2013.01); *F01M 2005/028* (2013.01); *B05B 15/061* (2013.01); *B05B 9/0423* (2013.01); *B05B 1/20* (2013.01); *B64C 13/42* (2013.01); *F16H 57/0456* (2013.01)

USPC ......................................... 184/6.12

(58) Field of Classification Search
USPC ........... 239/407, 416.4, 416.5, 418, 423, 433, 239/549; 184/6.11
See application file for complete search history.

(56) References Cited

U.S. PATENT DOCUMENTS

| 3,022,053 A | 2/1962 | Hoyt |
|---|---|---|
| 4,888,947 A * | 12/1989 | Thompson .................. 60/39.08 |

(Continued)

OTHER PUBLICATIONS

International Search Report and the Written Opinion of the International Searching Authority mailed by ISA/USA, U.S. Patent and Trademark Office on Jan. 13, 2010 for International Patent Application No. PCT/US2009/064505.

(Continued)

*Primary Examiner* — William E Dondero
*Assistant Examiner* — Mark K Buse
(74) *Attorney, Agent, or Firm* — James E. Walton; Richard G. Eldredge

(57) ABSTRACT

An injection jet includes a body having a first and a second passage disposed therein for channeling a fluid to a working element. The first passage remains fluidly separated from the second passage. A system includes the injection jet along with a main reservoir and an emergency reservoir. The first passage is in fluid communication with the main reservoir, while the second passage is in fluid communication with the emergency reservoir. The system operates in a standard mode and an emergency mode. Both the first passage and the second passage are configured for jointly supplying fluid to the working element during standard mode. The second passage is configured for independently supplying fluid to the working element during emergency mode.

12 Claims, 6 Drawing Sheets

(56) References Cited

U.S. PATENT DOCUMENTS

| | | | |
|---|---|---|---|
| 4,976,335 A * | 12/1990 | Cappellato | 184/6.4 |
| 5,029,759 A | 7/1991 | Weber | |
| 5,121,815 A * | 6/1992 | Francois et al. | 184/6.4 |
| 5,272,868 A | 12/1993 | Ciokajlo et al. | |
| 5,471,958 A | 12/1995 | Niemchick | |
| 6,032,872 A * | 3/2000 | Dupre | 239/14.2 |
| 6,126,111 A | 10/2000 | Burcham et al. | |
| 7,108,203 B2 * | 9/2006 | Huffman et al. | 239/427 |
| 7,377,404 B2 * | 5/2008 | Cherfane | 222/145.1 |
| 7,387,189 B2 * | 6/2008 | James et al. | 184/6.11 |
| 2007/0048679 A1 | 3/2007 | Joshi et al. | |

OTHER PUBLICATIONS

Canadian Office Action dated Dec. 13, 2013 from counterpart CA App. No. 2779199.

EP Office Action dated Jan. 14, 2014 from counterpart EP App. No. 09851340.1.

Office Action dated May 27, 2014 from counterpart CN App. No. 200980162464X.

\* cited by examiner

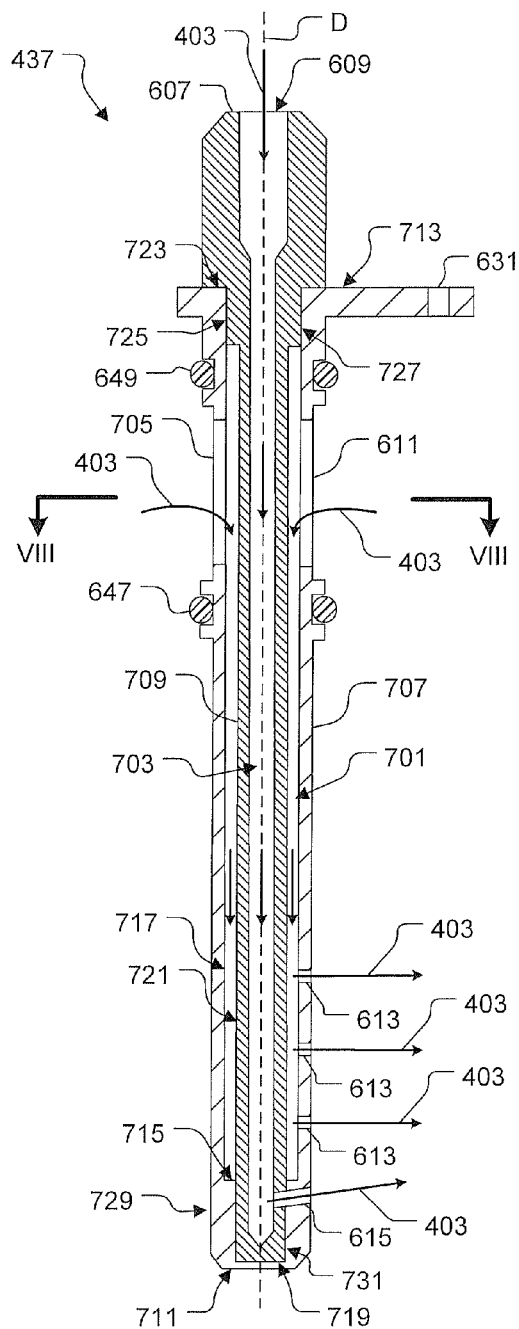
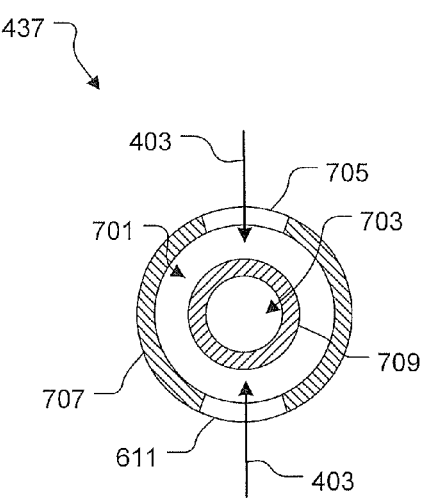
FIG. 8
FIG. 7

US 8,869,941 B2

DUAL-PATH FLUID INJECTION JET

TECHNICAL FIELD

The present application relates generally to the field of fluid systems and, more particularly, to fluid systems having injection jets.

DESCRIPTION OF THE PRIOR ART

Fluid systems are well known in the art for providing fluid to working elements such as aircraft ailerons, gearboxes, bearings, tractor arms, and other similar devices. There exists a wide variety of fluid systems, including lubrication systems configured for effectively reducing heat and wear created between intermeshing parts. Fluid systems share a common feature, namely, fluid systems typically include a reservoir for storing a fluid, a drive subsystem for providing pressure to the fluid, and a plurality of conduits for channeling the fluid from the reservoir to a working element.

Some fluid systems are subject to extensive wear and exposed to hostile environments. For example, components for a tractor-arm hydraulic system could easily be damaged by the harsh environment associated therewith. In some fluid systems, damage to system's components could lead to catastrophic results. For example, a lubrication system in fluid communication with an aircraft gearbox could malfunction while the aircraft is in flight, resulting in the gearbox seizing and the aircraft becoming inoperable.

Although the foregoing developments represent great strides in the area of fluid systems, many shortcomings remain.

BRIEF DESCRIPTION OF THE DRAWINGS

The novel features believed characteristic of the application are set forth in the appended claims. However, the application itself, as well as a preferred mode of use, and further objectives and advantages thereof, will best be understood with reference to the following detailed description when read in conjunction with the accompanying drawings, wherein:

FIG. 7 is a cross-sectional view of the injection jet of FIG. 6 taken at VII-VII;
and
FIG. 8 is a transverse cross-sectional view of the injection jet of FIG. 7 taken at VIII-VIII.

Figure 1:
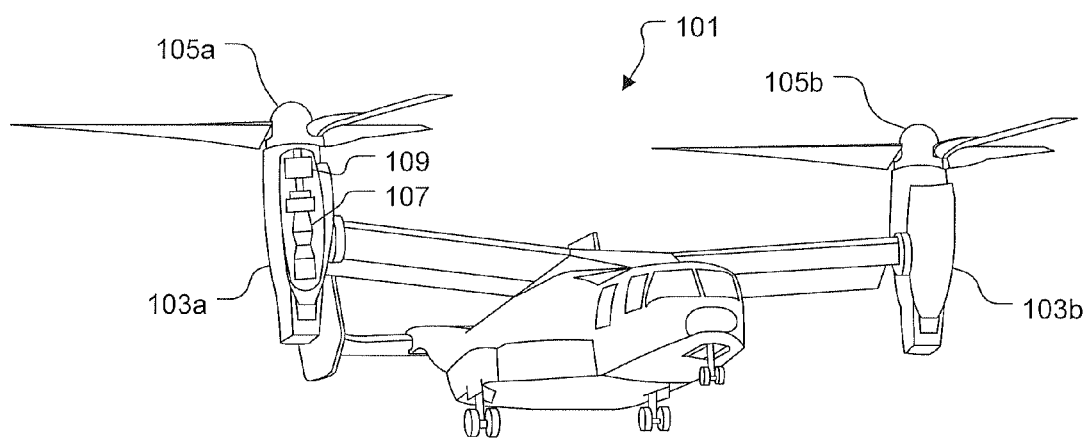
FIG. 1 is an oblique view of a tiltrotor aircraft.

While the preferred embodiment of the present application is susceptible to various modifications and alternative forms, specific embodiments thereof have been shown by way of example in the drawings and are herein described in detail. It should be understood, however, that the description herein of specific embodiments is not intended to limit the invention to the particular embodiments disclosed, but on the contrary, the intention is to cover all modifications, equivalents, and alternatives falling within the spirit and scope of the preferred embodiment of the present application as defined by the appended claims.

DESCRIPTION OF THE PREFERRED EMBODIMENT

The fluid system of the present application overcomes the disadvantages associated with conventional fluid systems. Illustrative embodiments are described below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present application is directed to an emergency subsystem for a fluid system. The fluid system is configured for use with any number of working elements such as components for cars, tractors, trucks, aircraft, and other vehicles or devices. In the preferred use, the fluid system is a lubrication system configured for providing lubricant to various aircraft components such as a rotor gearbox. The present application discloses a fluid system including an emergency subsystem in fluid communication with a main subsystem. Both subsystems include reservoirs coupled to a plurality of conduits for channeling fluid to the working element. The fluid system creates a closed circuit, wherein fluid is circulated through the subsystems and the working element.

The fluid system operates in a standard mode and an emergency mode. During standard mode, both the main and emergency subsystems provide fluid to the working element. During emergency mode, the emergency subsystem independently provides fluid to the working element. The emergency reservoir is configured for carrying a sufficient amount of fluid to allow adequate time for the operator to operate the working element before the working element becomes inoperable. A one-way passage valve is coupled to a conduit interconnecting the emergency reservoir to the main reservoir. The one-way passage valve is configured for allowing fluid to pass from the main reservoir to the emergency reservoir during standard mode and prevents fluid from returning back to the main reservoir during emergency mode.

The present application includes a fluid system configured for providing fluid to various types of working elements. For example, the present application could be incorporated with a hydraulic piston for an aileron, tractor arm, or other device that receives fluid. It should be understood that the fluid can be any type of liquid or gas, i.e., a lubricant.

Figure 2:
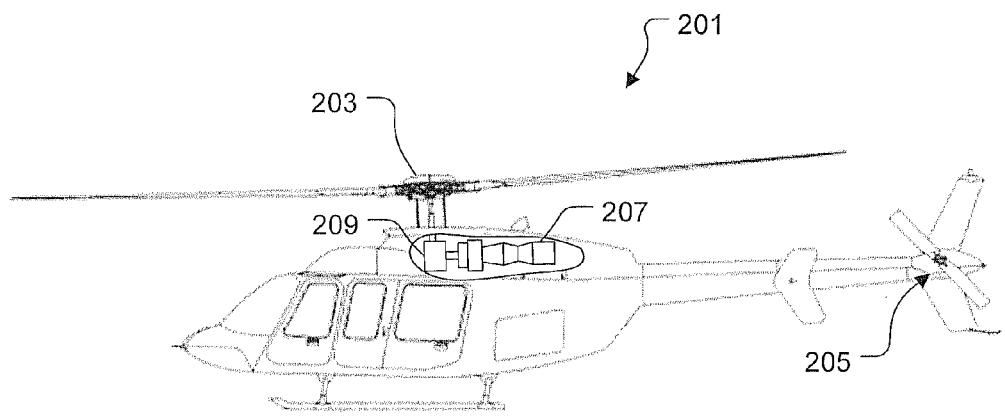
FIG. 2 is a side view of a helicopter.

In one embodiment, the preferred fluid system is configured for use with an aircraft rotor gearbox. In this embodiment the fluid system provides lubricant to intermeshing gears and supporting bearings disposed therein. The lubricant reduces friction heat and wear created by the intermeshing gears. FIGS. 1 and 2 illustrate two aircraft having gearboxes in fluid communication with lubrication systems. FIG. 1 illustrates a tiltrotor 101, while FIG. 2 illustrates a helicopter 201. Tiltrotor 101 includes two nacelles 103a and 103b for carrying respective rotor hubs 105a and 105b. A cutout view of nacelle 103a illustrates an aircraft engine 107 coupled to a gearbox 109. In FIG. 2, helicopter 201 is shown with a main rotor 203 and a tail rotor 205. A cutout view of helicopter 201 illustrates an engine 207 coupled to a gearbox 209. Both gearboxes 109 and 209 include a plurality of gears coupled to an input shaft and an output shaft. Gearboxes 109 and 209 are configured for significantly reducing the rotational speed of the engine input shaft. As a result, substantial friction heat and wear are created between the intermeshing gears and supporting bearings. The lubrication system provides means for overcoming undesired friction heat and wear created between the intermeshing gears and supporting bearings. Without lubricant, the gears and supporting bearings will eventually seize and the gearbox will become inoperable.

The fluid system of the present application includes an emergency subsystem configured for providing a reservoir of fluid in the event that the main subsystem fails. For example, the foregoing lubrication system could include an emergency reservoir for providing lubricant to the gearbox in the event that the main subsystem fails. The emergency reservoir could be configured for injecting lubricant at selected areas within into gearboxes 109 and 209 such that the gearbox remains operable, thereby allowing the pilot to safely land the aircraft before the gearbox seizes.

Figure 3A:
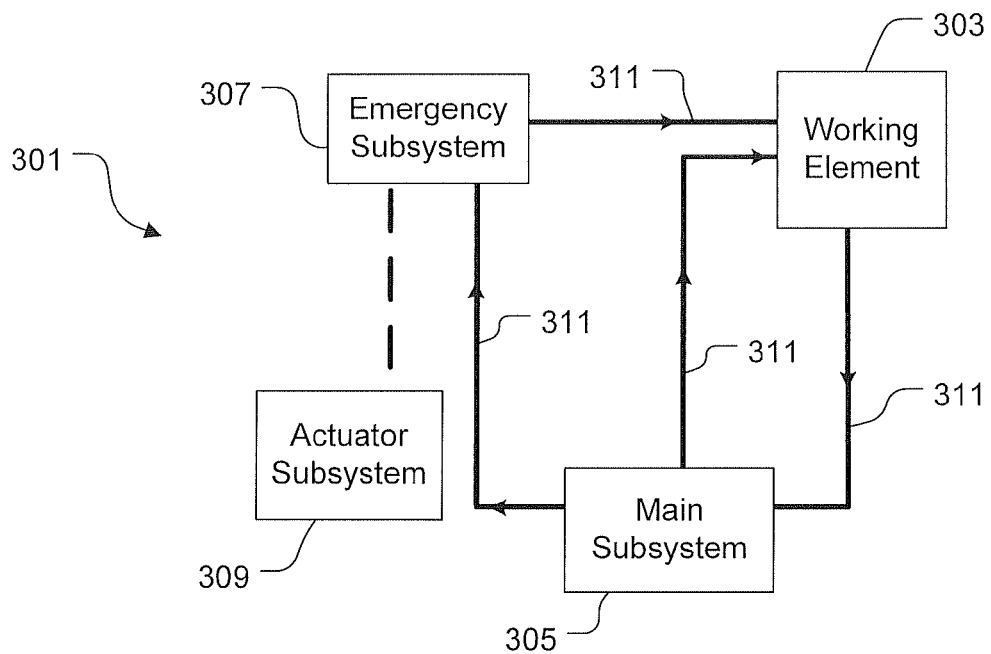
FIG. 3A is a block diagram of a fluid system according to the preferred embodiment of the present application shown operating in standard mode.
Figure 3B:
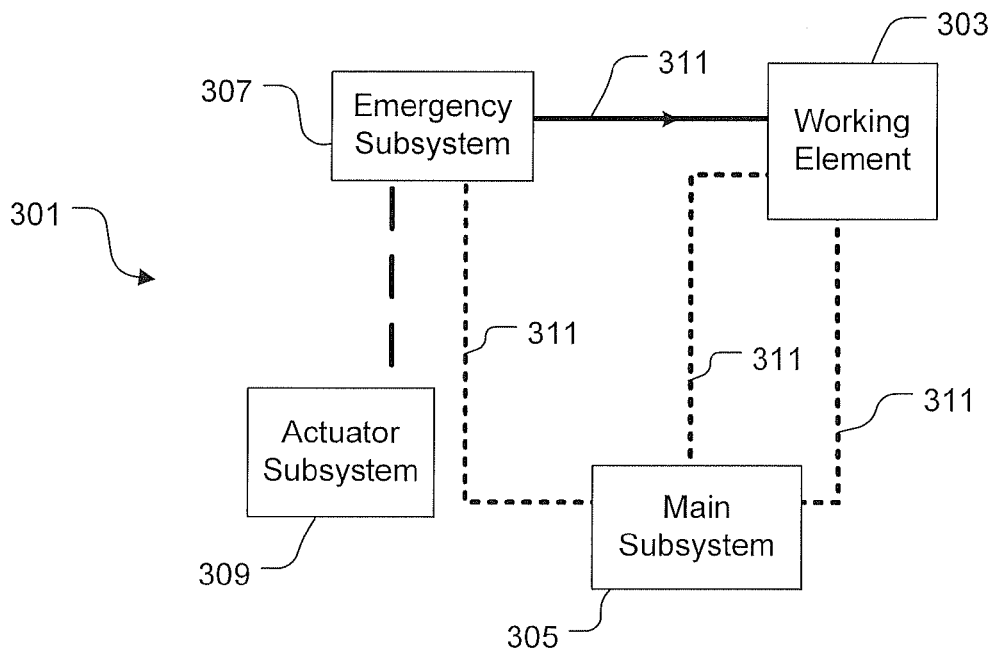
FIG. 3B is a block diagram of the fluid system of FIG. 3A shown operating in emergency mode.

Referring now to FIGS. 3A and 3B in the drawings, block diagrams of fluid system 301 according to the preferred embodiment of the present application are shown in fluid communication with a working element 303. FIG. 3A illustrates fluid system 301 operating in standard mode, while FIG. 3B illustrates fluid system 301 operating in emergency mode. Fluid system 301 can include one or more of a main subsystem 305, an emergency subsystem 307, and a drive subsystem 309. Fluid system 301 includes a plurality of conduits 311 for channeling fluid throughout the system. In the preferred embodiment, conduits 311 are hoses; however, it should be appreciated that alternative embodiments could include different means for channeling the fluid throughout the system. For example, an alternative embodiment could include pipes or other suitable channeling devices.

During standard mode, working element 303 is provided fluid from both main subsystem 305 and emergency subsystem 307. Main subsystem 305 provides fluid to both working element 303 and emergency subsystem 307. It should be understood that fluid is directed through emergency subsystem 307 during standard mode. A drive subsystem 309 is shown operable associated with emergency subsystem 307. During emergency mode, drive subsystem 309 is activated and configured for directing fluid from emergency subsystem 307 to working element 303. As is illustrated in FIG. 3B, emergency subsystem 307 independently provides fluid to working element 303 during emergency mode. It should be understood that the dashed conduit members 313 represent conduit members 311 devoid of fluid.

In the preferred embodiment, fluid system 301 includes one main subsystem 305 and one emergency subsystem 307 in fluid communication with one working element 303. However, it should be appreciated that alternative embodiments could include redundant fluid systems for providing fluid to the working element. Furthermore, alternative embodiments could include two or more emergency or main subsystems for providing fluid to the working element.

Figure 4:
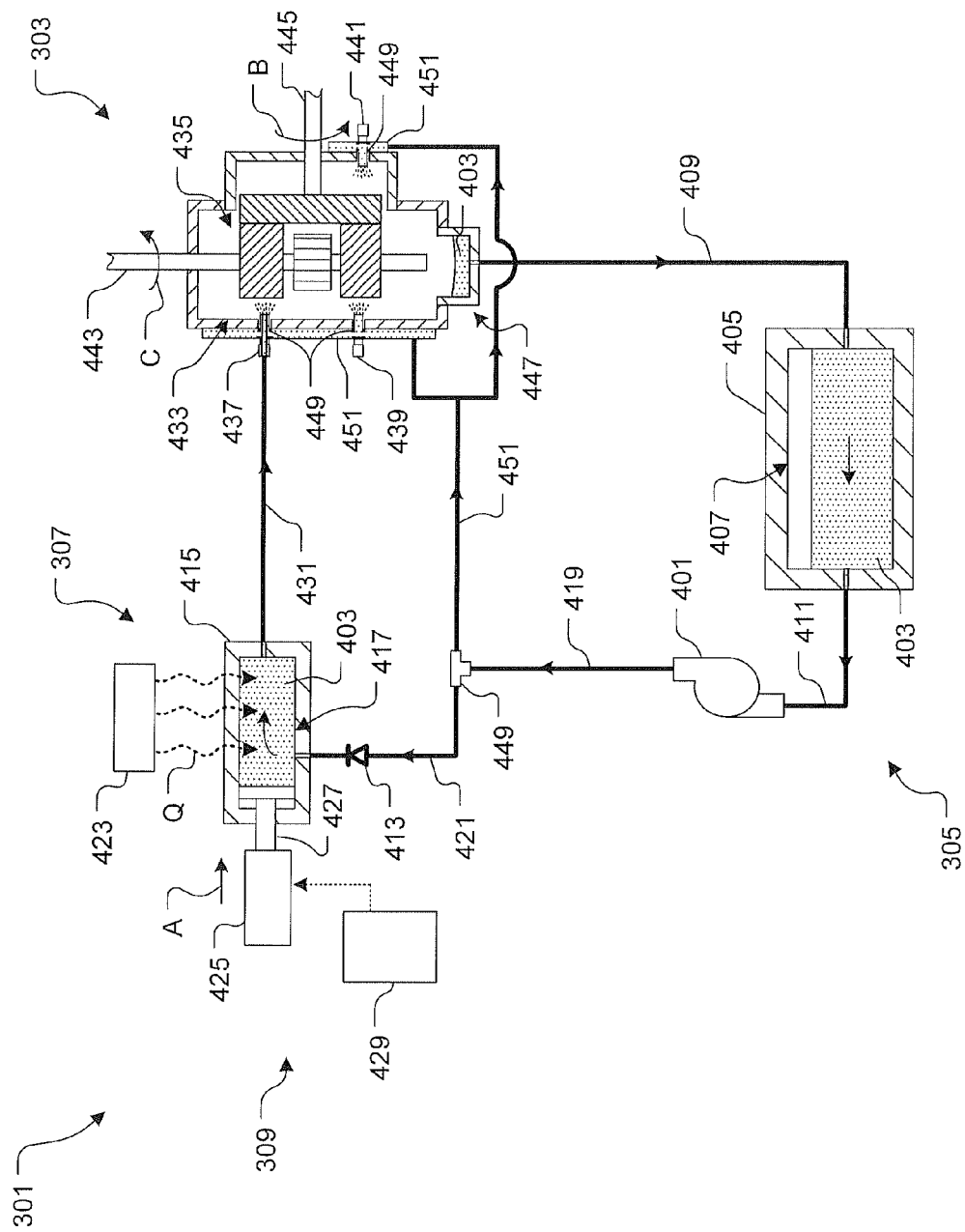
FIG. 4 is a schematic view of the fluid system of FIG. 3A.

Referring now to FIG. 4 in the drawings, a schematic view of fluid system 301 is shown operating in standard mode. FIG. 4 illustrates fluid system 301 in fluid communication with working element 303. In this embodiment, working element 303 is a gearbox; however, it should be understood that in alternative embodiments, working element 303 could include different apparatuses for receiving fluid from fluid system 301. For example, working element 303 could be a fluid piston for an aileron, tractor arm, or other device that receives fluid.

Main subsystem 305 includes a pump 401 configured for providing pressure to fluid 403. As is illustrated, fluid 403 is directed from main subsystem 305 to emergency subsystem 307 and to working element 303. Thereafter, fluid 403 returns to main subsystem 305 to be recirculated through fluid system 301. In the preferred embodiment, main subsystem 305 includes one pump 401 for providing pressure to fluid 403. However, it should be appreciated that alternative embodiments could include a plurality of pumps selectively positioned throughout fluid system 301 for providing additional pressure to fluid 403.

Main subsystem 305 also includes a main reservoir 405 having a main chamber 407 for containing fluid 403. Two conduits members 409 and 411 couple to main chamber 407. As is illustrated, fluid 403 is channeled through conduit 409, passes through main chamber 407, and exits through conduit 411. Thereafter, fluid 403 is channeled to the suction side of pump 401. In the preferred embodiment, main reservoir 405 is positioned separate from working element 303; however, it should be appreciated that alternative embodiments could include a main reservoir disposed within working element 303. For example, an alternative embodiment could use a sump section 447 as the main reservoir, thereby eliminating the need for main reservoir 405.

Emergency subsystem 307 can include one or more of a one-way valve 413 and an emergency reservoir 415. Emergency reservoir 415 includes an emergency chamber 417 for containing fluid 403. As is illustrated, fluid 403 is circulated from main subsystem 305 to emergency subsystem 307 through conduit members 419 and 421. Thereafter, fluid 403 passes through emergency subsystem 307 and is directed to working element 303.

One-way passage valve 413 is configured for allowing fluid 403 to pass from main reservoir 405 to emergency reservoir 415 and prevents fluid 403 from returning back to main reservoir 405 during both standard and emergency modes. In the preferred embodiment, one-way passage valve 413 is a passive valve configured for passively restricting the backflow of fluid 403. However, it should be appreciated that alternative embodiments could include different devices, such as active valves, in lieu of the preferred embodiment. For example, an alternative embodiment could include an active valve controlled by a control subsystem configured for automatically opening and shutting the valve during respective standard and emergency modes.

An optional heater 423 is configured for providing a heat Q to fluid 403. It should be understood that in some applications, fluid 403 has the propensity to freeze at high altitudes or in cold climates. For example, lubricant for an aircraft gearbox could freeze when exposed to cold conditions such as flight at high altitudes or flight in cold climates. Heater 423 overcomes the freezing problems by adding heat to the fluid. As is illustrated, heater 423 provides heat to fluid 403 disposed within emergency reservoir 415; however, it should be appreciated that heater 423 could be configured to heat alternative components of fluid system 301. For example, heater 423 could be coupled to main reservoir 405 or any of the plurality of conduit members. In an alternative embodiment, an electric coil could wrap around the conduit members for providing heat to fluid channeled therein.

Drive subsystem 309 operably associates with emergency subsystem 307 and can include one or more of an actuator 425, a piston 427, and a control station 429. Piston 427 is shown disposed within chamber 417 and coupled to actuator 425. During emergency mode, actuator 425 traverses piston 427 in the direction A, thereby directing fluid 403 through conduit member 431 and into working element 303.

In the preferred embodiment, actuator 425 is configured for receiving fluid from a separate hydraulic system. However, it should be appreciated that alternative embodiments of drive subsystem 309 could include other similarly suitable devices in lieu of the preferred configuration. For example an alternative embodiment could include a gear device or a pump configured for directing fluid 403 from emergency reservoir 415 to working element 303.

Control station 429 is operably associated with actuator 425 for controlling the traverse speed of piston 427. For example, in one embodiment control station 429 could be configured for providing a sufficient amount of lubricant to an aircraft gearbox for overcoming seizing while reserving a sufficient amount of lubricant such that maximum flight is achieved before the gearbox seizes. It should be appreciated that control station 429 could either be manually operated by an operator or automatically controlled with a computer system.

Fluid system 301 is configured for overcoming problems associated with storing stagnant fluid. For example, over period of time, stagnant lubricant gradually leads to heat degradation. As a result, the stagnant lubricant fails to perform its intended function of efficiently reducing friction heat and wear created between intermeshing parts. As is illustrated, emergency subsystem 307 is located in fluid communication with main subsystem 305. This configuration enables fluid 403 to circulate through emergency reservoir 415 during standard mode. In addition, it should be appreciated that emergency subsystem 307 is readily adaptable to existing fluid systems. For example, emergency subsystem 307 could easily be coupled to conduits 421 and 431 of an already existing fluid system.

Working element 303 can include one or more of an inner chamber 433, a plurality of gears 435, and a plurality of injection jets 437, 439, and 441. An input shaft 443 and an output shaft 445 couple to gears 435 and rotation in respective directions C and B. As is illustrated, fluid 403 is injected at selected areas within working element 303 through injection jets 437, 439, and 441. Thereafter, fluid 403 is accumulated at a sump section 447 positioned within working element 303. Fluid 403 leaves sump section 447 through conduit member 409 and returns to main reservoir 405 for recirculation through fluid system 301.

A valve 441 is provided for directing fluid 403 from main subsystem 305 to conduit members 421 and 451. Fluid 403 from main subsystem 305 is channeled through conduit member 451 and directed to injection jets 439 and 441. FIG. 4 illustrates main and emergency subsystems 305 and 307 in fluid communication with injection jets 439, 441 and 437; however, it should be appreciated that any number of injection jets could be used. For example, an alternative embodiment could include a single injection jet configured for fluid communication with both main and emergency subsystems 305 and 307.

In the preferred embodiment, injection jet 437 is configured for injecting lubricant at selected areas where the gearbox has the highest propensity to seize. For example, higher friction heat and wear is created between the planetary gears and supporting bearings. Thus, injection jet 437 could be configured for injecting lubricant solely to the planetary gears and supporting bearings.

Working element 303 includes a plurality of slots 449 configured for mating with injection jets 437, 439, and 441. Slots 449 provide passage for injection jets 437, 439, and 441 to inject fluid 403 within working element 303. In the preferred embodiment, a channel 451 is disposed within the sidewall of working element 303 and is configured for providing fluid 403 from main subsystem 305 to injection jets 437, 439, and 441; however, it should be appreciated that alternative embodiments could include different devices in lieu of channel 451. For example, an alternative embodiment could include a plurality of hoses configured for channeling fluid from the main reservoir to the injection jets.

Figure 5:
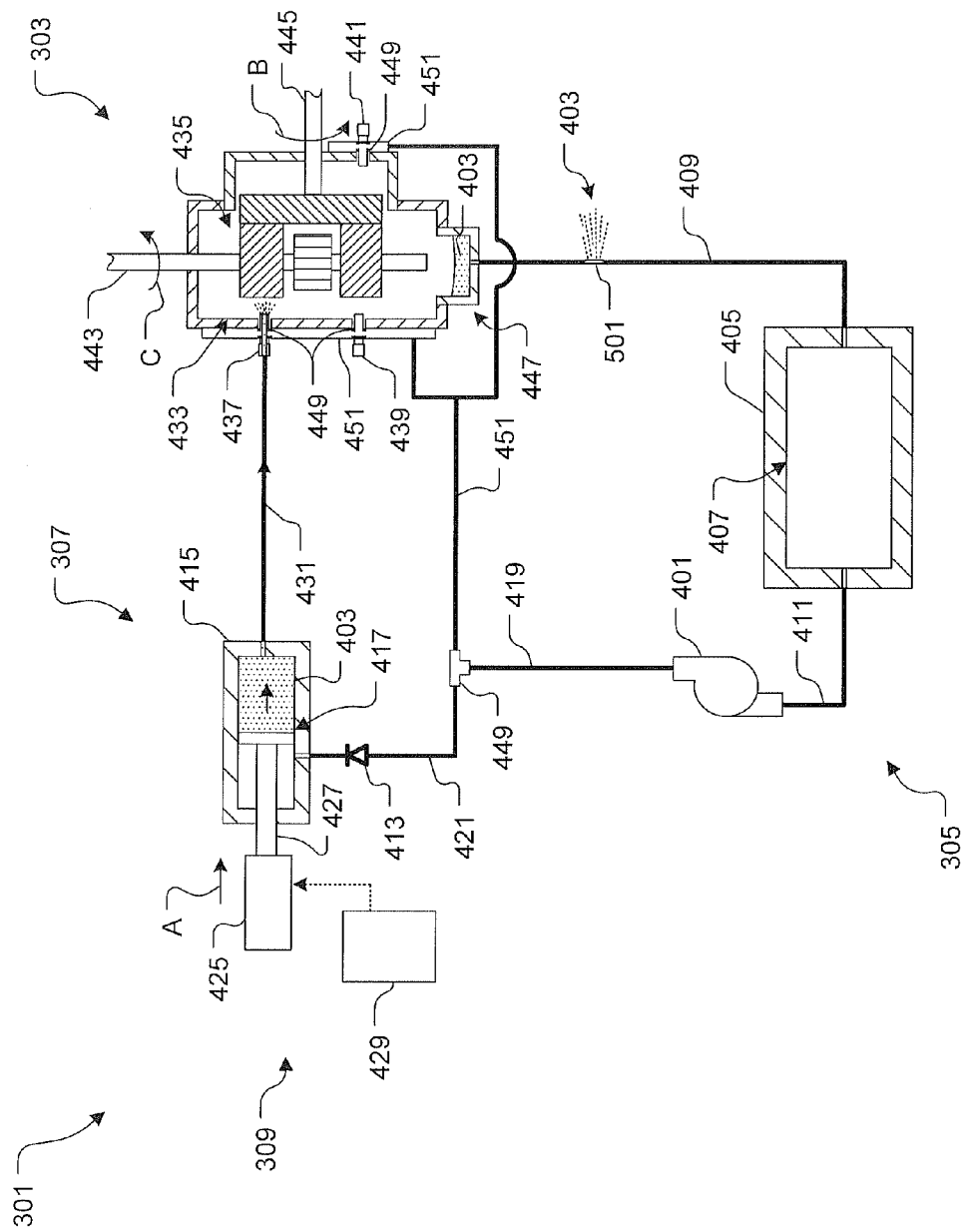
FIG. 5 is a schematic view of the fluid system of FIG. 3B.

Referring now to FIG. 5 in the drawings, a schematic view of fluid system 301 is shown operating in emergency mode. In this mode, an event, such as a hole 501 puncturing through conduit member 409, causes fluid 403 to leak, thereby depleting main reservoir 405 of fluid 403. As a result, main subsystem 305 becomes inoperable and fails to provide fluid 403 to working element 303. During emergency mode, actuator 425 traverses piston 427 in direction A, thereby directing fluid 403 from emergency reservoir 415 to working element 303.

In one embodiment, working element 303 is an aircraft rotor gearbox and fluid 403 is a lubricant. In this embodiment an aircraft engine (not shown) couples to input shaft 443 and rotates a rotor (not shown) coupled to output shaft 445. Input shaft 443 rotates at approximately 15,000 revolutions per minute, while output shaft 445 rotates at approximately 300 revolutions per minute. The large reduction in rotational speed causes a significant amount of friction heat and wear between intermeshing gears 435. For this reason, continuous lubricant is required to overcome seizing.

Emergency reservoir 415 is configured for carrying a sufficient amount of fluid 403 to allow adequate time for operating working element 303 before becoming inoperable. For example, sufficient lubricant is provided to an aircraft rotor gearbox such that the pilot has enough time to land the aircraft before the gearbox seizes. It should be understood that emergency reservoir 415 can be configured to contain various amounts of fluid 403. Some factors determining the size of emergency reservoir 415 include: the desired time required to operate the working element in emergency mode, added weight associated with increasing the size of emergency reservoir 415, and additional costs. For example, in one embodiment emergency reservoir 415 provides enough lubricant to maintain approximately 30 minutes of flight during emergency mode.

Figure 6:
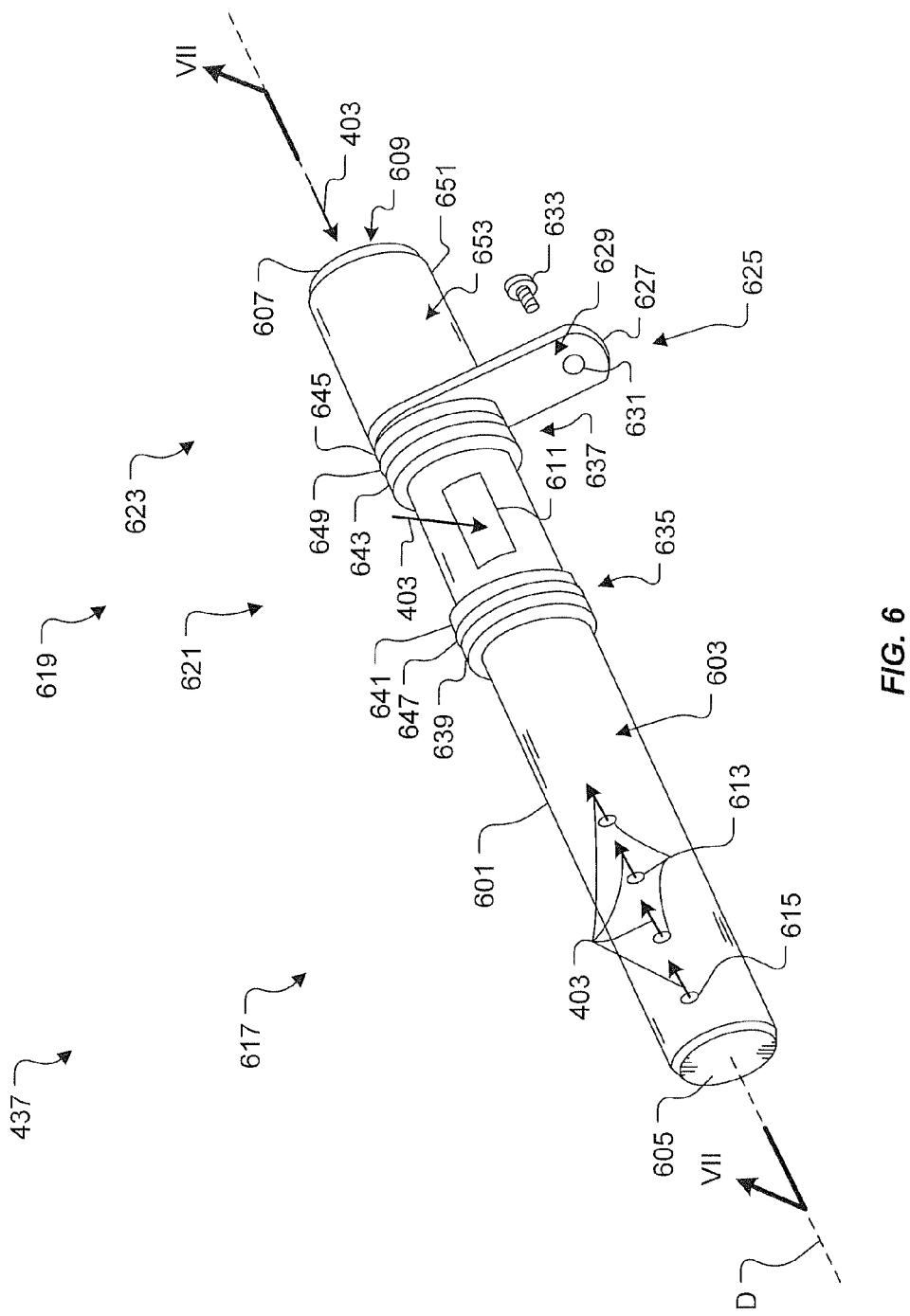
FIG. 6 is an oblique view of a dual-path injection jet according to the preferred embodiment of the present application.

Referring now to FIG. 6 in the drawings, an oblique view of injection jet 437 is illustrated. Injection jet 437 is configured for overcoming problems associated with conventional injection jets. For example, conventional injection jets typically include a single passage disposed within the body of the jet and configured for channeling fluid from one of either the main reservoir or the emergency reservoir. Injection jet 437 provides means for channeling fluid from both the main reservoir and the emergency reservoir during standard mode, and configured for channeling fluid from the emergency reservoir during emergency mode. Injection jet 437 is also readily adaptable for replacing existing conventional injection jets. For example, injection jet 437 could be manufactured such that injection jet 437 has the same size and shape as the conventional injection jet, thereby allowing working elements to be easily retrofitted with injection jet 437.

Injection jet 437 includes a body 601 having an outer surface 603 extending from end 605 to end 607 along longitudinal axis D. Longitudinal axis D extends along the centerline of body 601. Body 601 can have a smooth tubular configuration adapted for fitting within slot 449 of working element 303; however, it should be appreciated that alternative embodiments could include a body having different geometric shapes, the shapes being dependent on the geometric shape of the mating slot. Injection jet 437 includes one or more of an opening 609 and a slot 611 for enabling fluid 403 to enter into injection jet 437 from respective reservoirs 415 and 405. During standard mode, fluid 403 enters injection jet 437 through opening 609 and slot 611; thereafter, fluid 403 is channeled through passages disposed within body 601; and finally, fluid 403 exits through a plurality of injection ports 613 and 615.

Injection jet 437 includes an injection section 617 and a coupling section 619. Coupling section 619 could include one or more of two coupling subsections 621, 623 and an attachment device 625 positioned between coupling subsections 621 and 623. Coupling subsection 621 is in fluid communication with main subsystem 305, while coupling subsection 623 is in fluid communication with emergency subsystem 307. During operation, injection section 617 and coupling subsection 621 remain disposed within working element 303, while coupling subsection 623 remains exposed outside working element 303 for coupling with conduit 431.

In the preferred embodiment, attachment device 625 includes a flange 627 rigidly attached to and extending from surface 603. Flange 627 includes a surface 629 adapted for abutting against the outer surface of working element 303. Flange 627 also includes a hole 631 for receiving a screw 633. Screw 633 passes through flange 627 and securely fastens to a fastener hole (not shown) on the outer surface of working element 303. It should be appreciated that alternative embodiments could include different devices for securing injection jet 437 to working element 303. For example, a clip, bolt, snap-on device or other suitable devices could be used in lieu of the preferred attachment device 625.

Main coupling subsection 621 includes sealing devices 635 and 637 for supporting injection jet 437 within slot 449. Sealing devices 635 and 637 also serve as means for preventing fluid 403 from leaking between channel 451 and coupling subsection 621. Sealing devices 635 and 637 include respective sets of sealing flanges 639, 641 and 643, 645 rigidly attached to and extending around the outer circumference of surface 603. Sealing flanges 639, 641 and 643, 645 securely hold respective sealing rings 647 and 649. Sealing rings 647 and 649 are configured for engaging with the inner surface of slot 449, thereby forming a tight seal between slot 449 and coupling subsection 621. In the preferred embodiment, sealing rings 647 and 649 are composed of an elastomeric material; however, it should be appreciated that alternative embodiments could include sealing rings composed of different materials, such as a metal or composite. Sealing devices 635 and 637 are configured for creating tight tolerances between sealing rings 647, 649 and the inner surface of slot 449 such that pivot and traverse movement of injection jet 437 within slot 449 is reduced.

In the preferred embodiment, coupling subsection 621 is configured for receiving fluid 403 from channel 451; however, it should be appreciated that main coupling subsection 621 could be configured for coupling to alternative devices in lieu of channel 451. For example, an alternative embodiment could include a plurality of conduits configured for coupling main subsystem 305 with slot 611, thereby eliminating the need for channel 451.

Coupling subsection 623 includes a coupling portion 651 configured for coupling to conduit 431. In the preferred embodiment, the inner surface of conduit 431 fits snugly around surface 653 of coupling portion 651. Thereafter, a hose clamp (not shown) is fitted tightly around the outer surface of conduit 431, thereby securing the inner surface of conduit 431 to surface 653. It should be appreciated that coupling subsection 623 could include alternative configurations or devices in lieu of the preferred coupling embodiment. For example, an alternative embodiment could include a threaded surface 653 adapted for receiving a threaded fastener coupled to conduit 431. In addition, an alternative embodiment could include a surface 653 having grooves, dimples, or other contoured surfaces for retaining conduit 431 to coupling portion 651.

Injection section 617 includes a plurality of injection ports 613 and 615 for injecting fluid 403 at selected areas within working element 303. FIG. 6 illustrates injection jet 437 having three injection ports 613 and one injection port 615; however, it should be appreciated that alternative embodiments could include more or less injection ports. In addition, alternative embodiments could include injection ports having different geometric shapes, such as rectangular slots, in lieu of the preferred geometric configuration. Furthermore, injection ports 613 and 615 could be tailored to inject fluid 403 into working element 303 at various angles. Injection ports 613 and 615 are positioned substantially linear one to another; however, it should be appreciated that injection ports 613 and 615 could be positioned at various locations around injection section 617.

Referring now to FIG. 7 in the drawings, a cross-sectional view of the injection jet 437 is shown taken at VII-VII of FIG. 6. Injection jet 437 includes a primary passage 701 and a secondary passage 703 disposed within primary passage 701. Primary passage 701 is configured for channeling fluid 403 from main reservoir 405, while secondary passage 703 is configured for channeling fluid 403 from emergency reservoir 415. Fluid 403 enters injection jet 437 through side slots 611, 705 and opening 609. Thereafter, fluid 403 is channeled through passages 701, 703 and exits through respective ports 613 and 615. In the preferred embodiment, primary and secondary passages 701 and 703 are configured for separately channeling fluid 403 through injection jet 437 such that fluid 403 from primary passage 701 does not commingle with fluid 403 from secondary passage 703. However, it should be appreciated that alternative embodiments could include a single passage for channeling fluid 403 from both main reservoir 405 and emergency reservoir 415. In this alternative embodiment, means for closing slots 611 and 705 during emergency mode are provided. Furthermore, an alternative embodiment could include a secondary passage configured for remaining apart from the primary passage. For example, an alternative embodiment could include a primary and secondary passage, each passage being configured to extend parallel and apart from each other.

Injection jet 437 includes one or more of a first member 707 and a second member 709 disposed within first member 707. Primary passage 701 is disposed within first member 707, while secondary passage 703 is disposed within second member 709. In the preferred embodiment, members 707 and 709 are composed of a metallic material selectively tailored to withstand heat created by working element 303; however, it should be appreciated that member 707 and 709 could be composed of a different material, such as a composite, plastic, or a combination thereof.

First member 707 includes a bottom surface 711 and an opposite top surface 713. Primary passage 701 includes an inner surface 717 that extends from top surface 713 to an end 715. Injection ports 613 provide means for fluid 403 to pass through inner surface 717 and first member 707. Second member 709 includes one or more of a bottom surface 719, an outer surface 721, and surfaces 723 and 725. Surfaces 723 and 725 are configured for abutting against respective top surface 713 and inner surface 717 of first member 707. Injection port 615 provides means for fluid 403 to pass through first and second members 707 and 709.

Injection ports 613 are configured for injecting fluid 403 at an angle perpendicular to passage 701; however, it should be appreciated that injection ports 613 could be configured to inject fluid 403 at various angles with respect to passage 701. Injection port 615 is configured for injecting fluid 403 at an angle with respect to secondary passage 703; however it should be appreciated that alternative embodiment could include an injection port 615 configured for injecting fluid 403 perpendicular with respect to passage 703. It is preferred that injection port 615 direct fluid 403 at an angle such that fluid 403 from emergency subsystem 307 is injected at the same location as fluid 403 injected from main subsystem 305.

Injection jet 437 includes a fastener means 727 positioned between surface 725 and inner surface 717 of respective second member 709 and first member 707 for securely fastening second member 709 to first member 707. In the preferred embodiment, fastener means 727 is an adhesive; however, it should be appreciated that alternative embodiments could include other means, such as threaded, welded, or braised surfaces, for coupling second member 709 securely to first member 707.

A bottom portion 729 is formed between bottom end 715 of primary passage 701 and bottom surface 711 of first member 707. Bottom portion 729 includes a slot 731 configured for receiving second member 709. In the preferred embodiment, an adhesive is used to rigidly secure second member 709 within slot 731; however, alternative embodiments could include other means or devices for securing second member 709 within slot 731. For example, an alternative embodiment could include a slot 731 having threaded ends for engaging with threaded ends on outer surface 721 of second member 709.

Referring now to FIG. 8 in the drawings, a transverse cross-sectional view of the injection jet 437 is shown taken at VIII-VIII of FIG. 7. FIG. 8 illustrates secondary passage 703 disposed within primary passage 701 and fluid 403 entering into primary passage 701 through slots 611 and 705. In the preferred embodiment, injection jet 437 include two slots 611 and 705; however, it should be appreciated that alternative embodiments could include more or less slots. In addition, alternative embodiments could include slots having different geometric shapes, such as plurality of holes, in lieu of the preferred rectangular configuration. Furthermore, it should be appreciated that second member 709 could be configured with different geometric shapes in lieu of the preferred tubular shape.

The embodiments of the injection jet shown herein provide many advantages, including: (1) means for channeling fluid from an emergency reservoir and a main reservoir simultaneously during standard mode; (2) means for channeling fluid from an emergency reservoir during emergency mode; and (3) providing an injection jet readily adaptable for replacing conventional single-path injection jets of an already existing fluid system.

It is apparent that an injection jet with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present embodiments are shown above, they are not limited to just these embodiments, but are amenable to various changes and modifications without departing from the spirit thereof.

The invention claimed is:

1. An injection jet for a fluid system having a first fluid reservoir and a second fluid reservoir, the injection jet comprising:
   a body;
   a first passage disposed within the body and in fluid communication with the first reservoir, the first passage being configured to receive fluid from a first port extending through a thickness of the body, the first port extending perpendicular to the first passage and being positioned between a first sealing ring and a second sealing ring;
   a second passage disposed within the body and in fluid communication with the second fluid reservoir;
   wherein the first passage and the second passage channel a fluid through the body; and
   wherein the fluid channeled through the first passage remains fluidly separated from the fluid channeled through the second passage while the fluid is channeled through the body such that fluid from the first reservoir remains separated from the second reservoir while channeled through the body.

2. The injection jet according to claim 1, wherein the first passage is coaxially aligned with a longitudinal axis of the body.

3. The injection jet according to claim 1, wherein the second passage is positioned within the first passage.

4. The injection jet according to claim 3, wherein the second passage is coaxially aligned with the first passage.

5. The injection jet according to claim 1, wherein the fluid enters or exits through a first port in fluid communication with the first passage in a direction relatively normal with respect to a longitudinal axis of the body and exits or enters the body in a direction relatively normal with respect to the longitudinal axis; and
   wherein the fluid enters or exits through a second port in fluid communication with the second passage in a direction relatively parallel with respect to a longitudinal axis of the body and exits or enters the body in a direction non-parallel with respect to the longitudinal axis.

6. A system for supplying a fluid to a working element, the system comprising:
   a main reservoir in fluid communication with the working element;
   an emergency reservoir in fluid communication with the working element; and
   an injection jet in fluid communication with both the main reservoir and the emergency reservoir, the injection jet comprising:
      a body;
      a first passage disposed within the body and in fluid communication with the main reservoir, the first passage being configured to channel the fluid from the main reservoir through the body and configured to receive fluid from a first port extending through a thickness of the body, the first port extending perpendicular to the first passage and being positioned between a first sealing ring and a second sealing ring; and
      a second passage disposed within the body and in fluid communication with the emergency reservoir, the second passage for channeling the fluid from the emergency reservoir through the body;
      wherein the fluid channeled through the first passage remains fluidly separated from the fluid channeled through the second passage while the fluid is channeled through the body such that fluid from the main reservoir remains fluidly separated from the emergency reservoir while channeled through the body;
wherein the system operates in a standard mode and in an emergency mode;
wherein both the first passage and the second passage supply the fluid to the working element during standard mode; and
wherein the second passage supplies the fluid to the working element during emergency mode.

7. The system according to claim 6, wherein the emergency reservoir is in fluid communication with the main reservoir such that a portion of the fluid from the main reservoir is channeled to the emergency reservoir.

8. The system according to claim 6, wherein the second passage is positioned within the first passage.

9. The system according to claim 8, wherein the second passage is coaxially aligned with the first passage.

10. The system according to claim 6, wherein the fluid from the second passage enters or exits the body in a direction relatively parallel with respect to a longitudinal axis of the body and exits or enters the body in a direction non-parallel with respect to the longitudinal axis; and
wherein the fluid from the first passage enters or exits the body in a direction relatively normal with respect to the longitudinal axis of the body and exits or enters the body in a direction relatively normal with respect to the longitudinal axis.

11. The system according to claim 6, wherein the working element is an aircraft component.

12. The system according to claim 6, wherein the fluid is a lubricant.

* * * * *